March 27, 1951 V. J. McCARTHY 2,546,899
COAL BORING HEAD
Filed Nov. 23, 1948 2 Sheets-Sheet 1

INVENTOR.
Vincent J. M<sup>c</sup>Carthy
BY
ATTORNEYS

Patented Mar. 27, 1951

2,546,899

UNITED STATES PATENT OFFICE 2,546,899

COAL BORING HEAD

Vincent J. McCarthy, Youngstown, Ohio, assignor to The Salem Tool Company, Salem, Ohio, a corporation of Ohio Application November 23, 1948, Serial No. 61,603

4 Claims. (Cl. 262—19)

1

The invention relates to apparatus for boring coal and the like, and more particularly to a dual boring head for attachment to the end of a conventional auger.

In the use of conventional augers with a boring machine for cutting into veins of coal and the like, particularly where a cut of any great depth is made into the coal, it is difficult to hold the auger in a straight path within the vein. Furthermore the size of the cut is limited by the diameter of the auger, which must be kept within certain limits.

It is an object of the invention to provide a boring head including a pair of rotary arms, having cutting bits thereon, operatively connected to the auger by suitable gearing.

Another object is to provide such a cutting head in which the rotary arms are rotated in unison in opposite directions.

A further object is to provide a boring head of this character in which the cuts of the rotary arms will overlap the cut of the auger, on each side thereof, so as to cooperate with the auger to produce a substantially elliptic cut covering a considerably greater area than is possible with the use of the auger alone.

A still further object is to provide such a boring head which will guide the auger in a straight path through the coal or other material.

Another object is to provide a boring head of this type which will feed the cut coal into the spiral vane of the auger so as to be carried outwardly thereby.

A further object is to provide a boring head of the character referred to, having shoes thereon to prevent the boring head from rotating with the auger.

Figure 1:
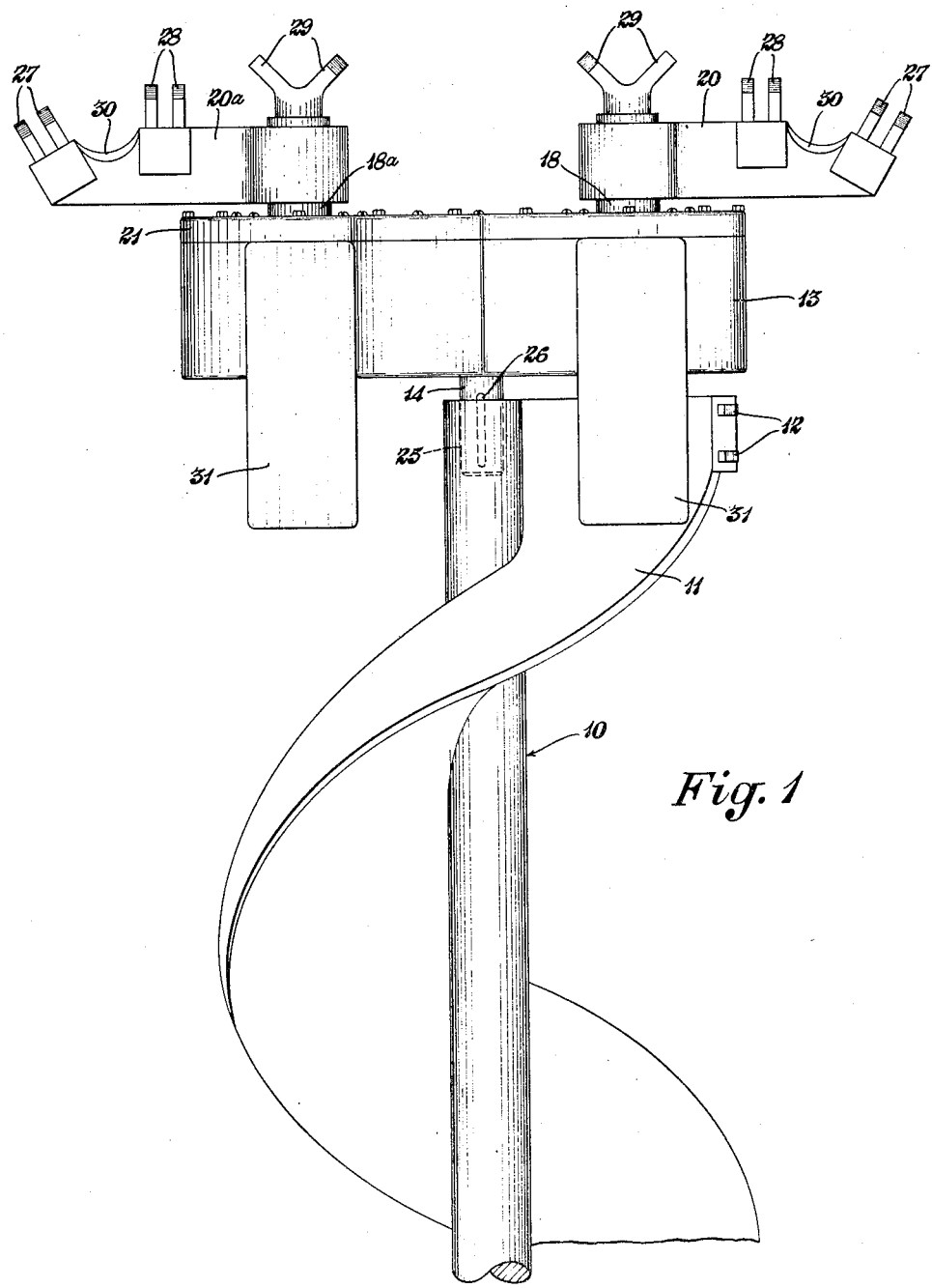
Figure 2:
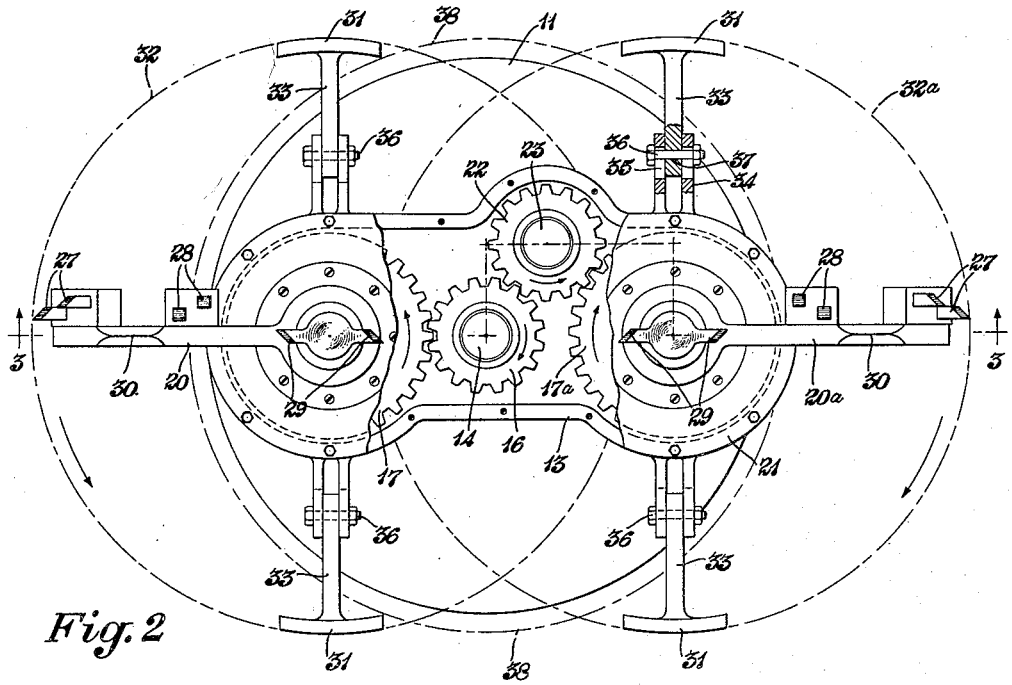

The above and other objects apparent from the drawings and following description, may be attained, the above described difficulties overcome and the advantages and results obtained, by the apparatus, construction, arrangements and combinations, sub-combinations and parts which comprise the present invention, a preferred embodiment of which, illustrative of the best mode in which applicant has contemplated applying the principle, being set forth in detail in the following description and illustrated in the accompanying drawings, in which:

Figure 1 is a top plan view of the end portion of an auger with the improved boring head mounted thereon;

Fig. 2 a front end elevation of the boring head with a part of the casing broken away to show the gearing by means of which the rotary arms

2 of the boring head are driven by the auger; and

Figure 3:
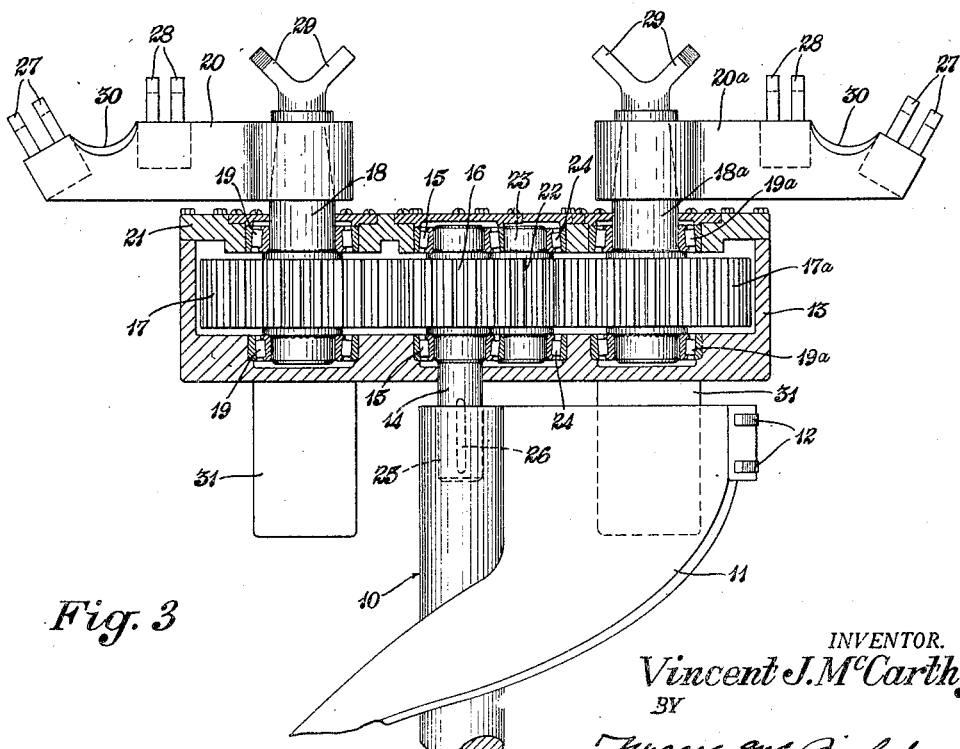

Fig. 3 a longitudinal section through the boring head taken as on the line 3—3, Fig. 2.

The auger, indicated generally at 10, may be of conventional design, having the usual spiral flight or vane 11 thereon, and for the purpose of this invention one or more bits 12 are mounted on the periphery of this vane at the end of the auger, as best shown in Figs. 1 and 3.

The improved cutting head, to which the invention pertains, includes a casing or gear housing 13 in which is mounted suitable gearing for operatively connecting the cutting head to the auger. A central shaft 14 is journalled in the housing, preferably by means of roller bearings indicated generally at 15, and has a driving pinion 16 fixed thereon.

This driving pinion meshes with a gear 17 fixed upon a shaft 18, which is journalled in the housing, preferably by means of the roller bearings 19, and a rotary arm 20 is fixed upon the forward end of the shaft 18, which protrudes through the front plate 21 of the housing. The driving pinion 16 also meshes with an idler pinion 22 fixed upon a shaft 23 journalled in the housing, preferably by means of the roller bearings 24.

The idler pinion 22 also meshes with a gear 17a, of the same size as the gear 17, and located in the opposite side of the housing therefrom, said gear 17a being fixed upon a shaft 18a journalled in the housing, as by means of the roller bearings 19a, the front end of the shaft 18a extending through the front plate 21 of the housing and having a rotary arm 20a, similar to the arm 20, fixed thereon.

The drive shaft 14 is attached to the end of the auger 10 so as to be rotated thereby, this attachment being shown in Figs. 1 and 3, wherein the rear end portion of the shaft 14, which extends through the rear wall of the housing 13, is located within a socket 25 in the end of the auger and fixed against rotation therein as by the key 26.

Suitable cutting means are provided upon each of the rotary arms 20 and 20a and as shown in the drawings may comprise a pair of angularly disposed bits 27 at the outer end of each arm, a pair of forwardly disposed bits 28 at the intermediate portion of each arm and a pair of diverging bits 29 at the inner end of each arm and axially aligned with the shafts 18 or 18a as the case may be.

An arcuate cutting edge 30 may also be formed on the forward edge of each of the arms 20 and 20a, between the pairs of bits 27 and 28, as shown in the drawings. For the purpose of preventing the entire boring head from rotating around the axis of the auger, shoes 31 are mounted upon the housing 13 above and below the same.

Each of these shoes is of arcuate shape, as best shown in Fig. 2, so as to fit within the cuts made by the rotary arms 20 and 20a, which are indicated by the broken lines 32 and 32a respectively in Fig. 2.

The shank 33 of each shoe is received between a pair of ears 34, formed upon the housing 13, these ears being preferably provided with elongated slots 35, a bolt 36 being located through said slots and through an aperture 37 in the shank 33 of the shoe, whereby the shoes may be independently adjusted both vertically and radially relative to the housing.

In the operation of the apparatus the auger 10 may be operated by a drilling or boring machine, which may be of the type shown in applicant's prior Patent No. 2,394,194 dated February 5, 1946, or any of the usual and well known types of boring or drillling machines such as are commonly used for boring into the earth.

As the auger is continuously rotated by the drilling machine, the rotary arms 20 and 20a will be rotated in unison in opposite directions as indicated on Fig. 2, so as to cut into the vein of coal and bring the cut coal downward and outward so that it will be fed to the auger and conveyed outward as in usual practice.

It should be understood that the arms 20 and 20a are so positioned that they will not come into contact with each other during the operation of the apparatus, although in the drawings, for the purpose of illustration, these arms are shown in all sections as diametrically opposite to each other.

With the shoes 31 adjusted properly, it will be seen that they will ride forwardly in the cut, preventing rotation of the housing around the axis of the auger and producing a cut of the shape shown in Fig. 2.

It will also be seen that as the auger moves forward in the cut, the bits 12 thereon will make a cut such as indicated in broken lines at 38 in Fig. 2, joining the cuts 32 and 32a made by the rotary arms 20 and 20a respectively, so that a substantially elliptic cut, of considerably greater area than the auger, will be made in the coal, removing a considerably greater quantity of coal than would be possible with the auger alone, while the shoes 31 will guide the boring head in a straight line through the vein of coal, thus overcoming the difficulties encountered with the use of the conventional auger for this purpose.

Although a single arm 20 or 20a is shown upon each shaft 18 or 18a respectively, it should be understood that two or more of these arms, equidistant from each other, may be mounted upon each of these shafts if it is desired to speed up the cutting action of the head.

According to the provisions of the patent statutes, I have explained the principle of my invention, and described an embodiment thereof, but I desire to have it understood that within the scope of the appended claims, the invention may be practiced otherwise than as specifically illustrated and described, the invention residing in the provision of a dual boring head for connection to an auger.

I claim:

1. In combination with an auger having a spiral vane thereon, cutting means on the periphery of the vane at the forward end of the auger, a boring head comprising a laterally elongated housing, a centrally located driving shaft journalled in the housing, means for operatively connecting said driving shaft axially to the auger, a driving pinion fixed upon the driving shaft, a driven shaft journalled in the housing on each side of the driving shaft, driven pinions mounted upon said driven shafts and operatively connected to the driving pinion, a cutting arm fixed upon each driven shaft and cutting means upon the forward sides of said cutting arms, whereby the cutting arms will produce circular cuts overlapping the cut produced by the auger so as to form a substantially elliptical cut.

2. In combination with an auger having a spiral vane thereon, cutting means on the periphery of the vane at the forward end of the auger, a boring head comprising a laterally elongated housing, a centrally located driving shaft journalled in the housing, means for operatively connecting said driving shaft axially to the auger, a driving pinion fixed upon the driving shaft, a driven shaft journalled in the housing on each side of the driving shaft, driven pinions mounted upon said driven shafts and operatively connected to the driving pinion, a cutting arm fixed upon each driven shaft and cutting means upon the forward sides of said cutting arms, whereby the cutting arms will produce circular cuts overlapping the cut produced by the auger so as to form a substantially elliptical cut, and arcuate guide shoes mounted on the top and bottom of the housing and positioned to slide within the cuts produced by the cutting arms to prevent rotation of the housing.

3. In combination with an auger having a spiral vane thereon, cutting means on the periphery of the vane at the forward end of the auger, a boring head comprising a laterally elongated housing, a centrally located driving shaft journalled in the housing, there being an axial socket in the forward end of the auger for receiving the adjacent end of the driving shaft for operatively connecting said driving shaft axially to the auger, a driving pinion fixed upon the driving shaft, a driven shaft journalled in the housing on each side of the driving shaft, driven pinions mounted upon said driven shafts and operatively connected to the driving pinion, a cutting arm fixed upon each driven shaft and cutting means upon the forward sides of said cutting arms, whereby the cutting arms will produce circular cuts overlapping the cut produced by the auger so as to form a substantially elliptical cut.

4. In combination with an auger having a spiral vane thereon, cutting means on the periphery of the vane at the forward end of the auger, a boring head comprising a laterally elongated housing, a centrally located driving shaft journalled in the housing, means for operatively connecting said driving shaft axially to the auger, a driving pinion fixed upon the driving shaft, a driven shaft journalled in the housing on each side of the driving shaft, driven pinions mounted upon said driven shafts and operatively connected to the driving pinion, a cutting arm fixed upon each driven shaft and cutting means upon the forward sides of said cutting arms, whereby the cutting arms will produce circular cuts overlapping the cut produced by the auger so as to form a substantially elliptical cut, and vertically and radially adjustable arcuate guide shoes mounted on the top and bottom of the housing and positioned to slide within the cuts produced by the cutting arms to prevent rotation of the housing.

VINCENT J. McCARTHY.

REFERENCES CITED

The following references are of record in the file of this patent:

UNITED STATES PATENTS

| Number | Name | Date |
|---|---|---|
| 1,077,620 | Mathews | Nov. 4, 1913 |
| 1,350,059 | Blackwell | Aug. 17, 1920 |
| 1,645,007 | Johansen | Oct. 11, 1927 |
| 1,653,111 | Lobbey | Dec. 20, 1927 |
| 1,812,719 | Schroder | June 30, 1931 |
| 1,871,638 | Vodoz | Aug. 16, 1932 |
| 2,404,605 | Thompson | July 23, 1946 |